US011943267B1

(12) United States Patent
Nelson et al.

(10) Patent No.: US 11,943,267 B1
(45) Date of Patent: Mar. 26, 2024

(54) DISPLAYING CONTENT FROM A SECONDARY DEVICE IN A CONFERENCE

(71) Applicant: Zoom Video Communications, Inc., San Jose, CA (US)

(72) Inventors: Lara Marie Nelson, San Jose, CA (US); Brandon Kevin Roper, Washington, UT (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 18/306,746

(22) Filed: Apr. 25, 2023

(51) Int. Cl.
*H04L 65/1083* (2022.01)
*H04L 65/403* (2022.01)
*H04N 5/272* (2006.01)
*H04N 7/15* (2006.01)

(52) U.S. Cl.
CPC ................... *H04L 65/403* (2013.01)

(58) Field of Classification Search
CPC ... H04L 65/403; H04L 12/18; H04L 65/1083; G06F 3/0485; G06F 3/0484; H04N 7/15; H04N 12/1822; H04N 5/272
USPC ......................................................... 709/204
See application file for complete search history.

(56) References Cited

U.S. PATENT DOCUMENTS

| 6,853,398 | B2 | 2/2005 | Malzbender et al. | |
|---|---|---|---|---|
| 9,503,685 | B2 | 11/2016 | Baron, Jr. et al. | |
| 11,546,394 | B1* | 1/2023 | Yu | G06V 10/25 |
| 11,563,790 | B1* | 1/2023 | Yu | H04N 23/661 |
| 2008/0030621 | A1 | 2/2008 | Ciudad et al. | |
| 2010/0165889 | A1* | 7/2010 | Madabhushi | H04M 3/562 379/202.01 |
| 2012/0275349 | A1* | 11/2012 | Boyer | H04L 12/1822 370/261 |
| 2014/0074909 | A1* | 3/2014 | Gunderson | G06F 3/0482 709/203 |
| 2017/0164058 | A1* | 6/2017 | Garcia Navarro | H04N 21/23109 |
| 2017/0195736 | A1* | 7/2017 | Chai | H04N 21/4622 |
| 2020/0126513 | A1* | 4/2020 | Lau | G09G 5/14 |
| 2022/0374136 | A1* | 11/2022 | Chang | G06F 3/04845 |

OTHER PUBLICATIONS

YouTube, Split and Share Your Screen on Zoom, https://www.youtube.com/watch?v=sthFSqGqXIE, Miss Tech Queen, Jun. 25, 2020, 3 pages.
Zoom Support, Sharing your screen or desktop on Zoom, https://support.zoom.us/hc/en-us/articles/201362153-Sharing-your-screen-or-desktop-on-Zoom, Nov. 4, 2022, 4 pages.

(Continued)

*Primary Examiner* — Jude Jean Gilles
(74) *Attorney, Agent, or Firm* — Young Basile Hanlon & MacFarlane, P.C.

(57) ABSTRACT

A request to connect a primary device of a conference participant to a conference is received. A request to connect a secondary device of the conference participant to the conference is received. Content is received from the secondary device for display in a companion tile associated with the primary device. The content is displayed in the companion tile. The content can include a video stream obtained using a camera of the secondary device. The content can include screen content of the secondary device. The content includes a first image and a second image.

20 Claims, 12 Drawing Sheets

(56) References Cited

OTHER PUBLICATIONS

Wikihow, How to Share Pictures in a Zoom Meeting: Desktop & Mobile, https://www.wikihow.com/Show-Pictures-in-a-Zoom-Meeting, Darlene Antonelli, MA, Mar. 9, 2023, 3 pages.

Google Meet Help, Change background and apply visual effects in Google Meet, https://support.google.com/meet/answer/10058482?hl=en&co=GENIE.Platform%3DDesktop, Apr. 25, 2023, 2 pages.

YouTube, How to Download a Zoom Background from Google Photos, https://www.youtube.com/watch?v=OLMP3Lmi5Ro, Hans Tullmann, May 24, 202, 2 pages.

YouTube, How to Download a Zoom Background from Google Drive, https://www.youtube.com/watch?v=eqUnybdX_1A, Hans Tullmann, May 24, 2020, 2 pages.

Warmly, Warmly Leads are knocking on your door, but you're not answering, https://www.warmly.ai/, Apr. 25, 2023, 9 pages.

Microsoft, Desktop Live Wallpapers—Microsoft Store Apps, https://apps.microsoft.com/store/detail/desktop-live-wallpapers/9NZ370XBFQMG?hl=en-us&gl=us, Apr. 25, 2023, 4 pages.

How-To Geek, How to Change windows 10's Wallpaper Based on Time of Day, https://www.howtogeek.com/355912/how-to-change-windows-10s-wallpaper-based-on-time-of-day/, Chris Hoffman, Jun. 15, 2018, 17 pages.

Gadget Hacks Scho, Change Your Wallpaper automatically by Time, Day, Location & More: Android::Gadget Hacks, https://android.gadgethacks.com/how-to/change-your-wallpaper-automatically-by-time-day-location-more-0172629/, Dallas Thomaas, Aug. 5, 2016, 8 pages.

YouTube, Get a Contextually-Aware Wallpaper for android [How-To], https://www.youtube.com/watch?v=KpdelkltyoA&t=78s, Gadget Hacks, Aug. 5, 2016, 2 pages.

GooglePlay, Wallpapers, Google LLC, https://play.google.com/store/apps/details?id=com.google.android.apps.wallpaper&hl=en_US&gl=US&pli=1, Apr. 25, 2023, 5 pages.

* cited by examiner

DISPLAYING CONTENT FROM A SECONDARY DEVICE IN A CONFERENCE

FIELD

This disclosure relates generally to communication management and, more specifically, to joining a conference using a secondary device and sharing content to the conference from the secondary device.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
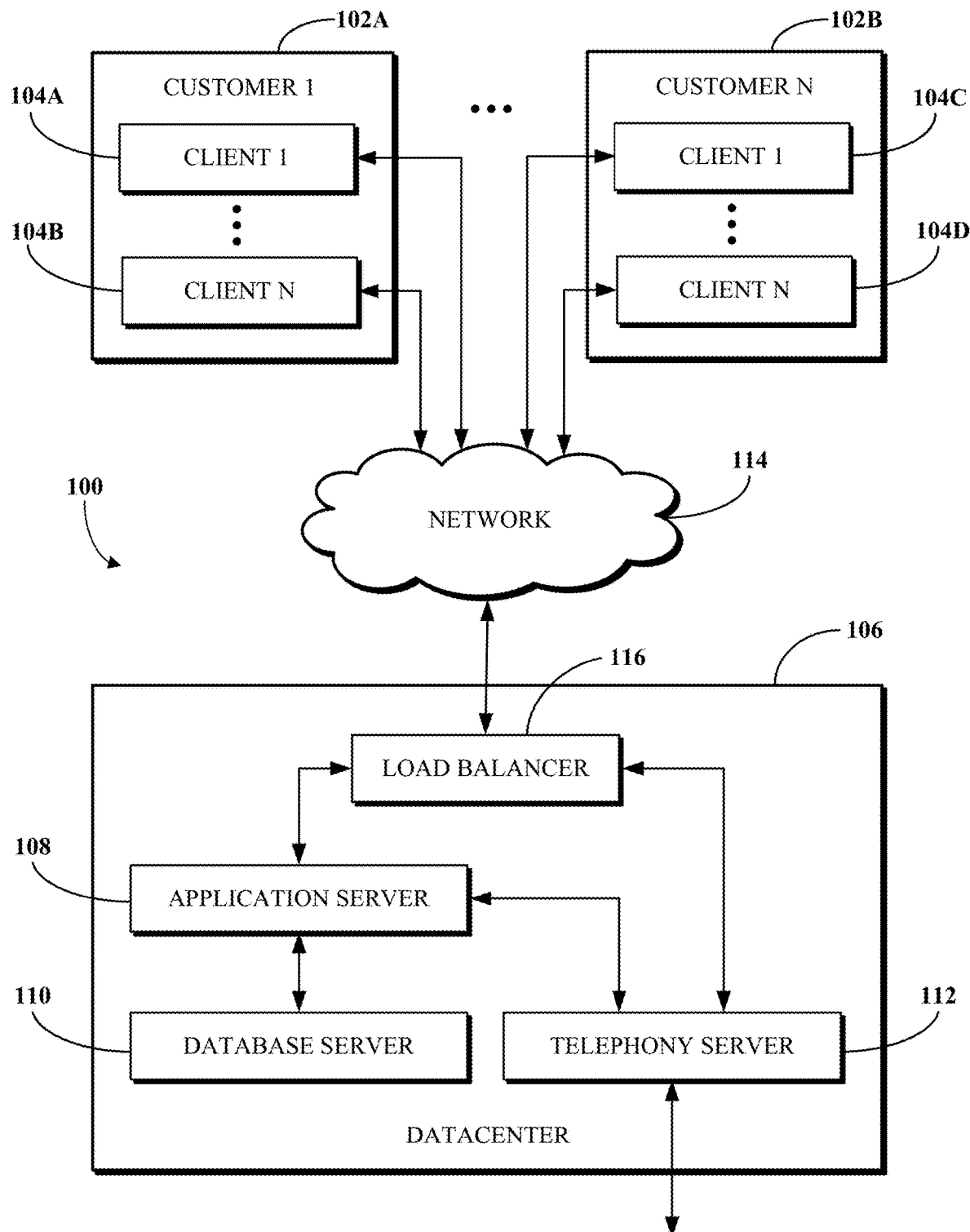
FIG. 1 is a block diagram of an example of an electronic computing and communications system.

A conferencing software, which may be standalone software or part of a software platform such as a unified communications as a service (UCaaS) platform, may allow conference participants to participate in audio-visual conferences. A conference participant may join a conference using a user device. The user device from which the conference participant joins the conference is said to be connected to the conference.

Conference participants may generally be visually represented within individual or group tiles rendered within a user interface of a conference. A "tile" as used herein can mean a portion of a user interface presented (e.g., displayed or caused to be displayed) by the conferencing software and is associated with a conference participant. The tiles associated with different conference participants may have the same or different sizes.

A conventional conferencing software may enable a conference participant who is joined to a conference to share content to or in the conference. To illustrate, at the user device via which a conference participant is joined to a conference, the conference participant can share content (e.g., a document, a program, a file, an image, or screen content) accessible to, or available at, the user device.

However, in some situations, a conference participant may want to share content that is available at another device (referred to herein as a "secondary device") that is different from the device (referred to herein as a "primary device") that the conference participant used to join the conference. To illustrate, and without limitations, the primary device may be a desktop or a laptop computer and the secondary device may be a handheld device (e.g., a mobile phone). The conference participant may wish to share images available at the handheld device to the conference.

In a first scenario, to share content that is at a secondary device, the conference participant transfers or makes available the content to the primary device. This can be time consuming for at least the conference participant (if done prior to the conference) and to all conference participants (if done during the conference).

In a second scenario, the conference participant can additionally join the conference using the secondary device for the purpose of sharing the content. However, that one conference participant is joined to the conference more than once can be confusing to the other conference participants, especially when multiple conference participants join via more than one device. This scenario increases the number of connections that the conferencing software has to maintain and manage. Additionally, the conferencing software would have to transmit audio and/or video streams of the conference participants (i.e., obtained from respective devices of the conference participants) to the secondary devices.

As such, the use of secondary devices to connect to conferences may result in increased resource utilization at the conferencing server therewith degrading the performance of the conferencing software and may cause some operations to fail due to resource exhaustion. The possibility for degraded performance and increased usage of the conferencing software may also include substantially increased investment in processing, memory, and storage resources for the conferencing software and may also result in increased energy expenditures (needed to operate those increased processing, memory, and storage resources, or for the network transmission of audio and/or video streams) and associated emissions that may result from the generation of that energy.

Implementations of this disclosure address problems such as these by enabling a conference participant to connect two devices (a primary device and a secondary device) to a conference while being shown to other conference participants as joined to the conference only once. Additionally, the conference participant can share content from the secondary device to the conference. The content is shown to the other conference participants in a companion user interface space associated with the conference participant.

To describe some implementations in greater detail, reference is first made to examples of hardware and software structures used to implement a system for joining a conference using a secondary device and/or sharing content to a conference from a secondary device. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
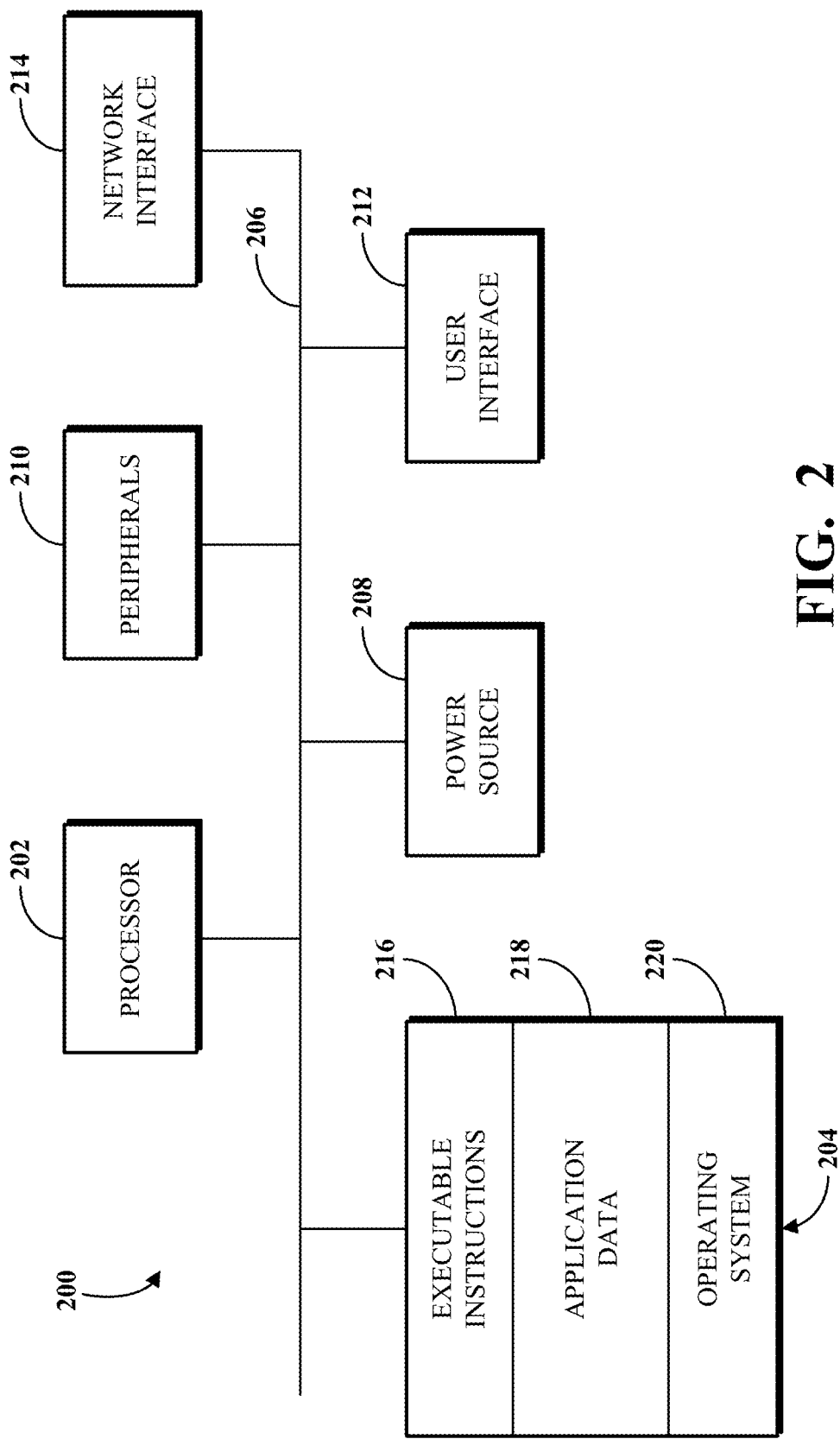
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®, an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
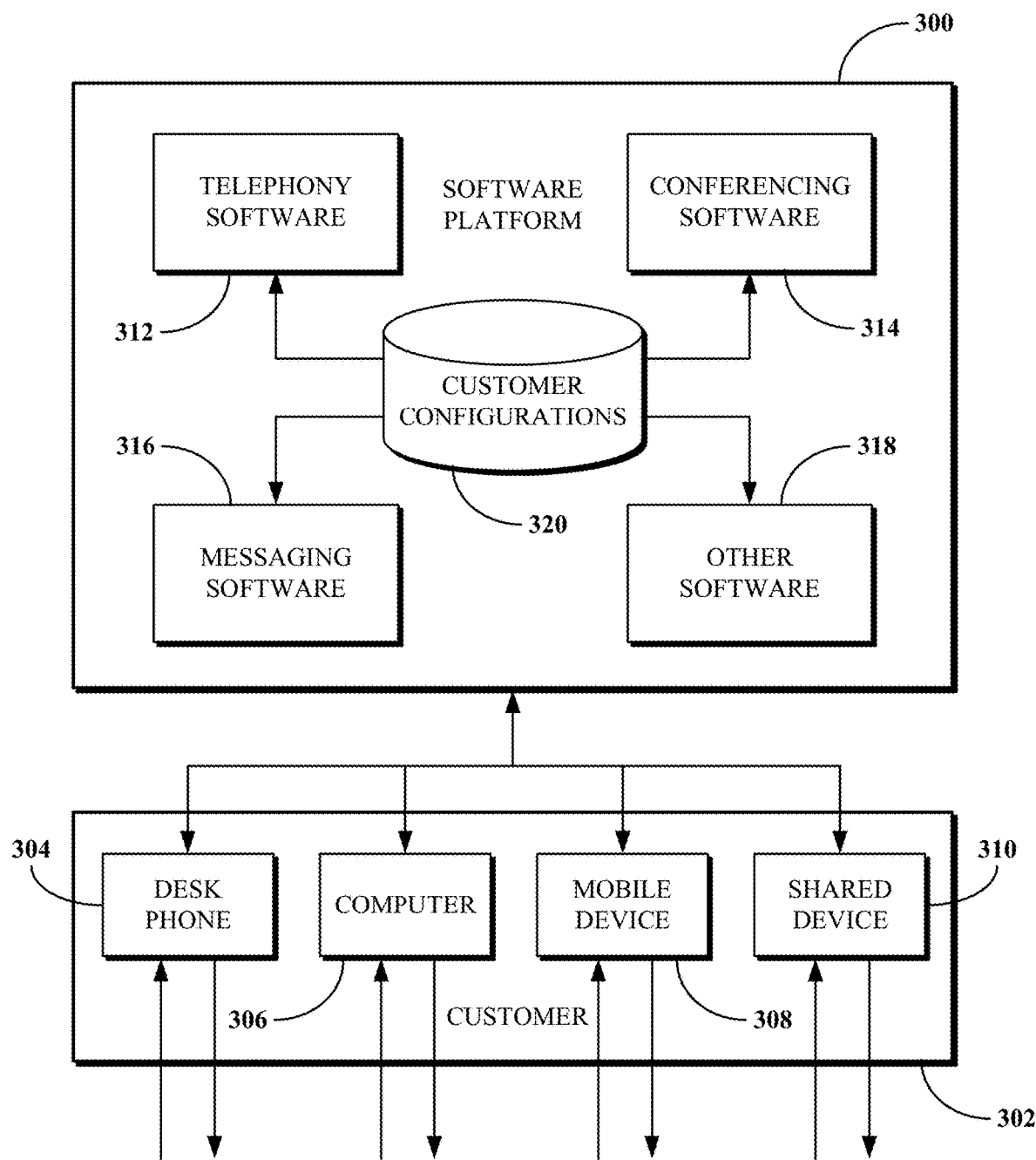
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include a secondary device management software that can be used by a conference participant to join a conference using a secondary device and to share content to the conference from the secondary device.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
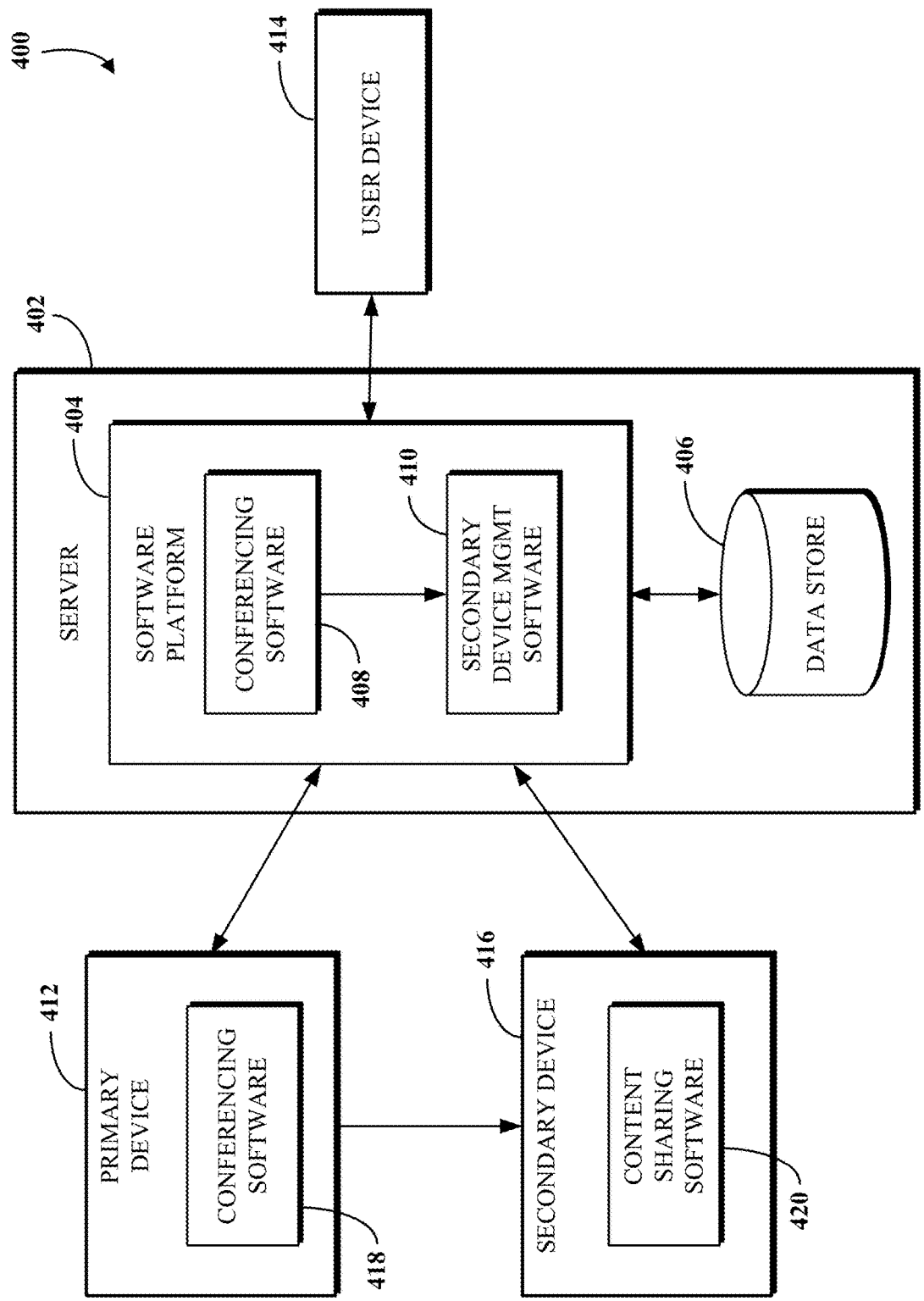
FIG. 4 is a block diagram of an example of a system for sharing content to a conference using a secondary device.

FIG. 4 is a block diagram of an example of a system 400 for sharing content to a conference using a secondary device. The system 400 includes a server 402 that enables users, inter alia, to participate in (e.g., virtually join) audio-visual conferences, also referred to as conferences. As shown, the server 402 implements or includes some or all of a software platform 404 and a data store 406. The server 402 can be one or more servers implemented by or included in a datacenter, such as the datacenter 106 of FIG. 1. While a single server (i.e., the server 402) is shown, in some cases, multiple servers may be used to implement the software platform 404, for example, by different servers implementing different or redundant functionality or services of the software platform 404.

The software platform 404, via the server 402, provides conferencing services (e.g., capabilities or functionality) via a conferencing software 408. The software platform 404 can be or can be part of the software platform 300 of FIG. 3. The conferencing software 408 can be variously implemented in connection with the software platform 404. In some implementations, the conferencing software 408 can be or can be integrated in the conferencing software 314 of FIG. 3.

A primary device 412 and a user device 414 of respective users are shown as being connected to the server 402. The connections to the server 402 indicate that the primary device 412 and the user device 414 are connected to a conference. As can be appreciated, many more user devices may simultaneously connect to a conference. Similarly, the software platform 404 implemented using the server 402 can enable many conferences to be concurrently active.

The primary device 412 and the user device 414 can be devices of users who are configured (e.g., enabled) to or otherwise can join a conference. Each of the primary device 412 and the user device 414 may, for example, be one of the clients 304 through 310 of FIG. 3. Alternatively, each of the primary device 412 and the user device 414 may be devices other than a client. Output images obtained (e.g., generated or composed) with respect to one conference participant (e.g., the conference participant associated with the primary device 412) can be transmitted, such as by the server 402, to devices of other conference participants (e.g., the user device 414). A conferencing software (not shown) of the user device 414 can cause the output images to be displayed on a display of the user device 414. As mentioned above, the output images can be displayed, at the user device 414, in a tile associated with the conference participant of the primary device 412.

An output image of a conference participant can include a foreground segment and a background segment. The foreground segment includes a representation of the conference participant. A "representation" of a conference participant, as used herein, broadly refers to or includes a representation indicative of the conference participant, such as a portrait, an image, a likeness, a body definition, a contour, a textual identifier, or any such representation of the conference participant. In an example, the representation can be a likeness of the conference participant as obtained from a foreground segment of a camera image that is obtained from the user device of the conference participant. The background segment can be or include the background as captured in the camera image, a virtual background (e.g., a replacement of the background), or some other background.

The conference participant is joined to the conference using the primary device 412. A secondary device 416 of the conference participant includes content that the conference participant shares during the conference. The secondary device 416 can be one of the clients 304 through 310 of FIG. 3. The conference participant can connect the secondary device 416 to the conference for the purpose of sharing the content. A secondary device management software 410 of the software platform 404 can obtain the content from the secondary device 416 for transmission and display at devices of conference participants, such as at least one of the primary device 412 or the user device 414. In an example, the secondary device management software 410 can be part of the conferencing software 408. The secondary device management software 410 can obtain the content from a content sharing software 420 implemented or executing at the secondary device 416.

In an example, the content sharing software 420 may transmit (e.g., stream) content to the secondary device management software 410. In an example, the secondary device management software 410 may receive a request for content from the primary device 412. In response to the request, the secondary device management software 410 may transmit the request to the content sharing software 420, which in turn may transmit the content to the secondary device management software 410. In an example, the primary device 412 (e.g., the conferencing software 418 therein) may transmit the request for content directly to the content sharing software 420, which in turn transmits the content to the secondary device management software 410. In an example, a request for content may be received by the secondary device management software 410 from the user device 414 (e.g., a conferencing software therein). In response to the request, the secondary device management software 410 may transmit the request to the secondary device 416, which in response transmits the content to the secondary device management software 410. As already mentioned, content received from the secondary device 416 can be displayed at devices of at least some conference participants in user interfaces (such as graphical user interfaces) associated with the conferencing software 408, such as further described with respect to FIG. 6.

The data store 406 can store data related to conferences and data related to users who have participated or may participate in one or more conferences. The data store 406 can be included in or implemented by a database server, such as the database server 110 of FIG. 1. The data store 406 can include data related to scheduled or ongoing conferences and data related to users of the software platform 404.

Figure 5:
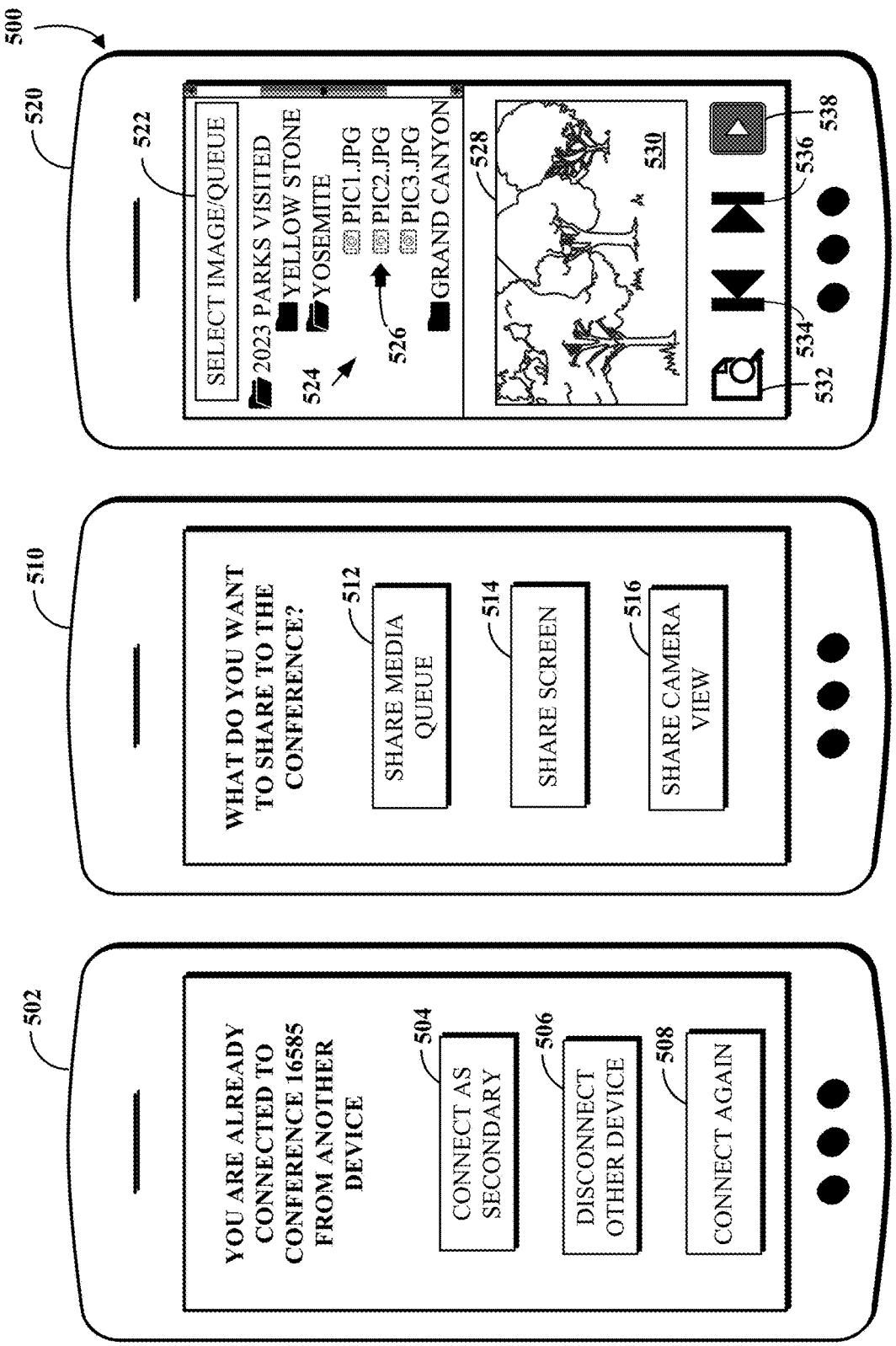
FIG. 5 illustrates examples of user interfaces that may be displayed at a user device that can be a secondary device.

FIG. 5 illustrates examples of user interfaces 502, 510, and 520 displayed at a user device that can be a secondary device, such as the secondary device 416 of FIG. 4. The user interfaces 502, 510, and 520 can be displayed by a content sharing software, such as the content sharing software 420 of FIG. 4.

The user interface 502 illustrates that a conference participant, using another device, such as the primary device 412 of FIG. 4, is already joined to a conference hosted by a conferencing software, such as the conferencing software 408 of FIG. 4. After joining the conference via the primary device, the conference participant attempts to connect the user device to the conference. To connect the user device to the conference, the conference participant may cause a request to join the conference to be transmitted from the user device to the conferencing software.

Figure 6:
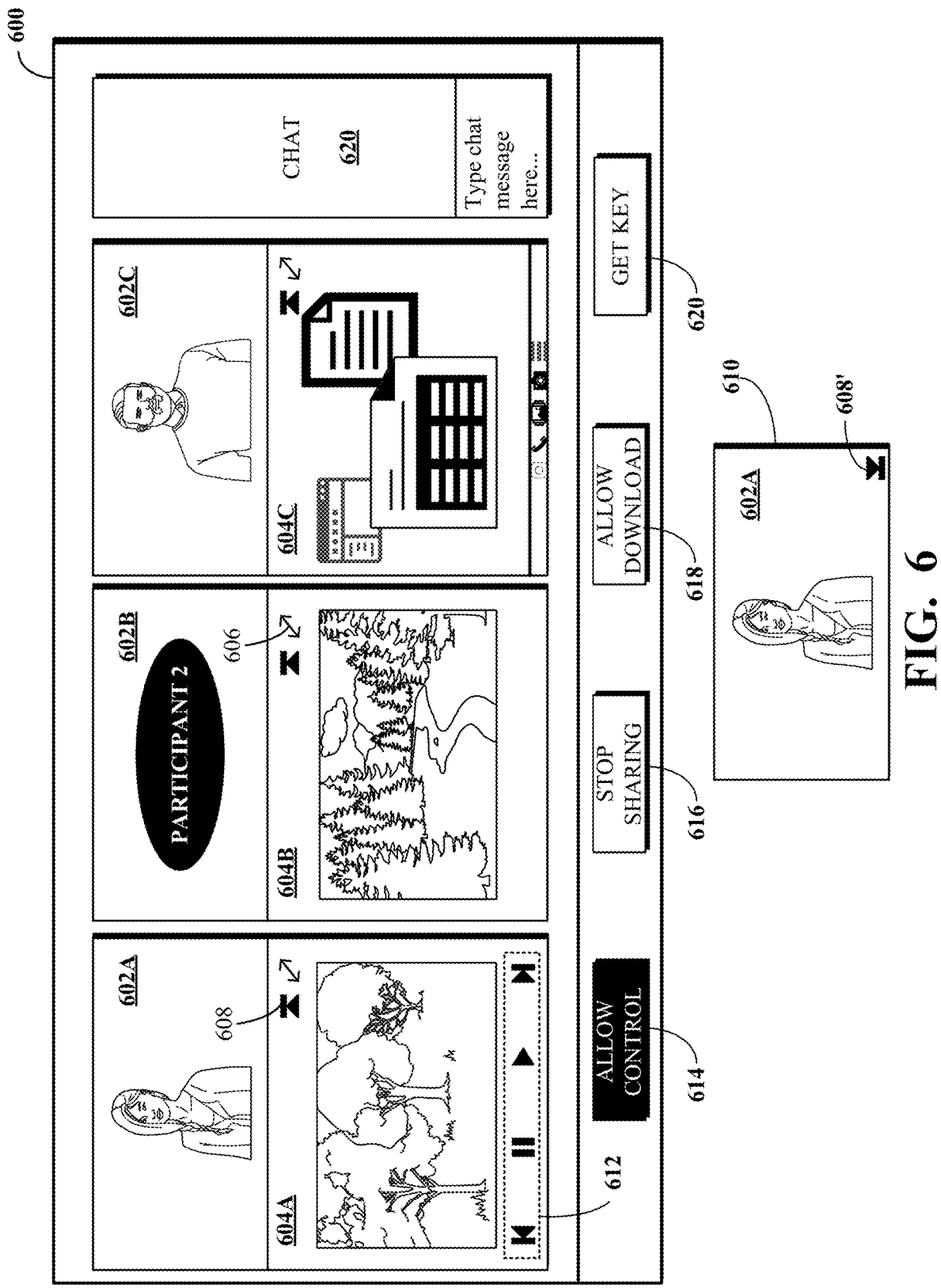
FIG. 6 is an example of a user interface that illustrates companion tiles.

In an example, the request to join the conference can indicate or include that the conferencing software is not to indicate to other conference participants that the conference participant is joined to the conference more than once, as further described with respect to FIG. 6. Said another way, the request to join the conference transmitted from the user device can indicate or include that the conferencing software is to connect the user device from which the request is received as a secondary device.

Figure 7:
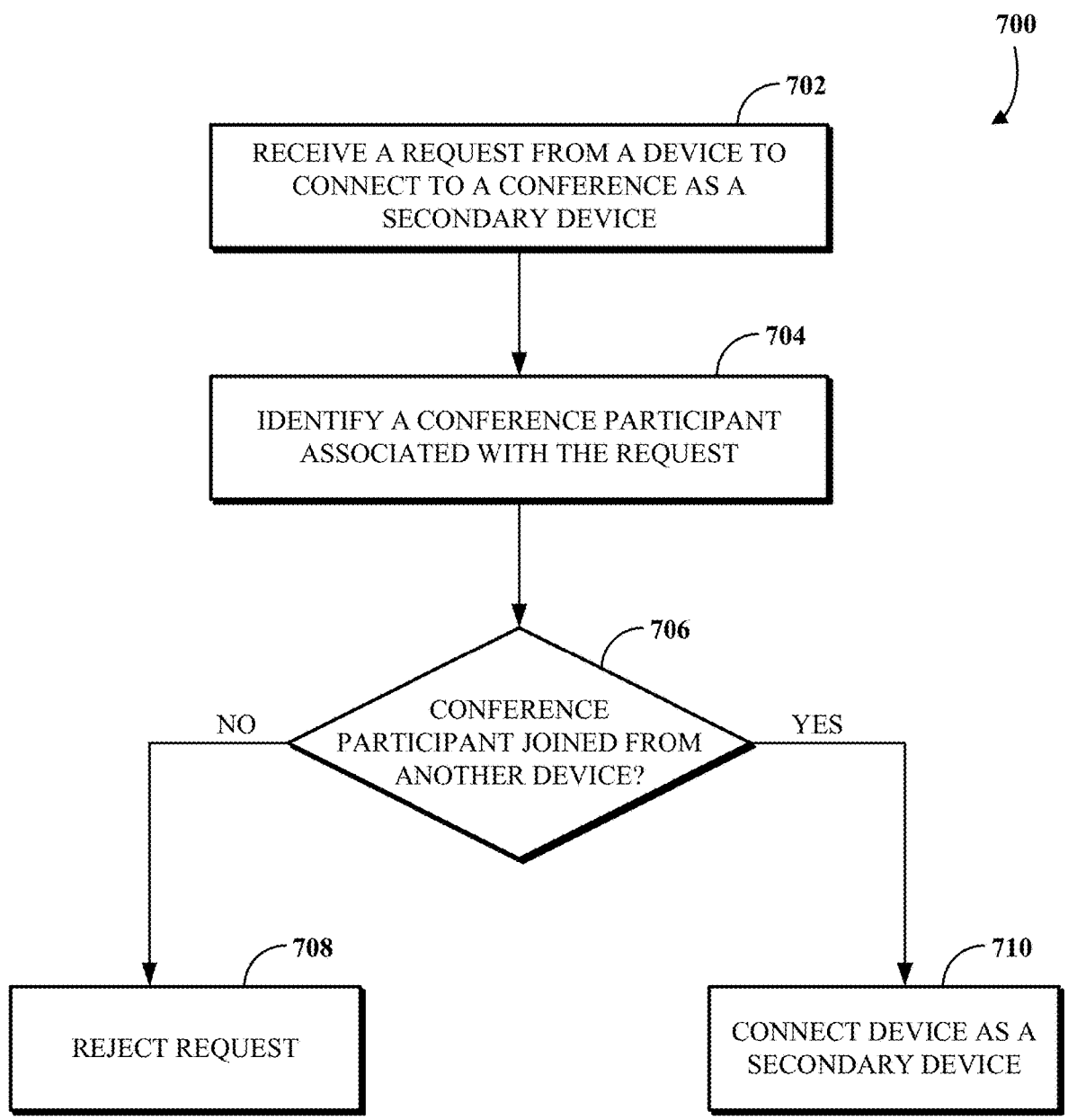
FIG. 7 is an example of a technique for connecting a user device to a conference as a secondary device.

In an example, and as further described with respect to FIG. 7, if the conference participant is not already joined to the conference using another device (i.e., a primary device), then the conferencing software may reject the request to connect the user device to the conference as a secondary device.

In an example, if the conferencing software determines, in response to receiving the request from the user device, where the request includes an identity of the conference participant, that the conference participant is already joined to the conference using another device (i.e., the primary device), the conferencing software can cause the content sharing software to display options 504-508 at the secondary device.

In response to the conference participant selecting (e.g., choosing) the option 504 (i.e., "CONNECT AS SECONDARY"), a confirmation request is transmitted from the user device to the conferencing software to connect the user device as a secondary device. In response to the conference participant selecting the option 506 (i.e., "DISCONNECT OTHER DEVICE"), a request is transmitted from the user device to the conferencing software to disconnect the primary device from the conference and to connect the user device as the primary device. In response to the request, the conferencing software disconnects the other device and connects the user device as the primary device. In response to the conference participant selecting the option 508 (i.e., "CONNECT AGAIN"), a request is transmitted from the user device to the conferencing software to connect the user device as another primary device. As such, the conference participants can be shown as being joined twice to the conference. When one of the options 506 or 508 is selected, then the content sharing software at the user device can act as (e.g., perform equivalent functions of) the conferencing software 418 of FIG. 4.

In response to a selection of the option 504, the content sharing software causes the user interface 510 to be displayed at the user device. By selecting an option 512 (i.e., "SHARE MEDIA QUEUE"), the conference participant can select to share, to the conference, one or more pictures, videos, or other media content (e.g., files) available (e.g., stored) at the user device. Accordingly, the content sharing software can transmit the selected media content to a secondary device management software, which can be the secondary device management software 410 of FIG. 4.

By selecting an option 514 (i.e., "SHARE SCREEN"), the conference participant can select to share the display (i.e., what is displayed at the display) of the user device. Accordingly, the content sharing software can transmit images of the display of the user device to the secondary device management software. By selecting an option 516 (i.e., "SHARE CAMERA VIEW"), the conference participant can select to share image data in the field-of-view of a camera of the user device to the conference. Accordingly, the content sharing software can transmit images (e.g., a video) captured by a camera of the user to the content sharing software. If the user device includes more than one camera, then the conference participant can select one of the cameras for active use and may also switch cameras for streaming to the conference.

In response to a selection of the option 512, the content sharing software causes the user interface 520 to be displayed at the user device. Via a control 522, the conference participant can select an image or a collection of images to share to the conference. An image list 524 illustrates that the conference participant selected to share the images included in a folder named "2023 PARKS VISITED" and all of its subfolders. A marker 526 marks the image (i.e., image 530) that is currently shown in a preview window 528.

A preview control 532 enables the conference participant to preview an image that the conference participants selects. A previous control 534, when invoked by the conference participant, causes the content sharing software to transmit an image that precedes the currently previewed image in the image list 524 to the secondary device management software. A next control 536, when invoked by the conference participant, causes the content sharing software to transmit an image that follows the currently previewed image in the image list 524 to the secondary device management software. An auto-play control 538 causes the content sharing software to transmit an image from the image list 524 to the secondary device management software, pause for a pause duration, and repeat the process for a next image in the image list 524. The pause duration can be a predefined pause duration or can be provided by the conference participant.

Other controls (not shown) may be available. For example, a stop-sharing control may be available, which enables the conference participant to cause the content sharing software to stop transmitting media content to the secondary device management software. For example, a pause/resume control (e.g., toggle) may be available, which enables the conference participant to pause an auto-play and to resume a paused auto-play.

FIG. 6 is an example of a user interface 600 that illustrates companion tiles. The user interface 600 can be displayed on a user device of a conference participant, such as the primary device 412 or the user device 414 of FIG. 4. The user interface 600 illustrates a conference that includes three participants. Each of the conference participants can be represented by a respective tile, such as a participant 602A tile, a participant 602B tile, and a participant 602C tile, respectively. For brevity and ease of description, statements such as "the <participant X> <verb>" should be understood to mean that the "participant represented by the participant X tile <verb>." The user interface 600 can be displayed or caused to be displayed at a user device of a conference by a conferencing software. The conferencing software can be the conferencing software 408 of FIG. 4, a conferencing software implemented at a user device, such as the conferencing software 418 of FIG. 4, or a combination thereof.

While FIG. 6 is mainly described with respect to sharing content from a secondary device, the disclosure herein is not so limited. For example, and as further described below, the content (e.g., images) to be shared by one of the conference participants can be available at and shared from the primary device of the conference participant and, as such, the conference participant may not use a secondary device.

The user interface 600 illustrates that each of the participants 602A and 602C has turned on their respective cameras and, as such, respective output images of these conference participants are displayed in the corresponding tiles on respective devices of other participants. The participant 602B has not turned on their camera. As such, the corresponding tile of the participant 602B shows an identifier (e.g., "PARTICIPANT 2") instead of an image of the participant 602B. As such, the representation of the participant 602B is the textual string "PARTICIPANT 2" displayed in a black-filled oval. The participants 602A, 602B, and 602C are illustrated as being joined to the conference using respective primary devices.

The user interface 600 also illustrates that each of the participants 602A, 602B, and 602C has connected a respective secondary device to the conference and is sharing content from the respective secondary device to the conference. As such, respective companion tiles 604A, 604B, and 604C are shown in the user interface 600. Even though each of the participants 602A, 602B, and 602C is connected via two respective devices (i.e., a primary device and a secondary device) to the conference, each of the participants 602A, 602B, and 602C is shown as being joined only once. For example, the user interface 600 does not include two separate tiles showing representations for each of the participants 602A, 602B, and 602C.

The user interface 600 illustrates that the participant 602A is sharing images via their secondary device. That is, the participant 602A may have selected the option 512 in the user interface 510 of FIG. 5. The user interface 600 illustrates that the participant 602B is streaming a camera view via their secondary device. That is, the participant 602B may have selected the option 516 in the user interface 510 of FIG. 5. The user interface 600 illustrates that the participant 602C is screensharing a view of the screen of their secondary device. That is, the participant 602C may have selected the option 514 in the user interface 510 of FIG. 5.

In an example, a companion tile may include an expand/collapse control, such as a control 606, that a conference participant can use to expand (if not expanded) and to collapse (if expanded) a companion tile. Expanding a companion tile can mean growing the size of the companion tile so that it occupies a substantial portion of the user interface 600. When a companion tile is expanded, at least the tiles showing the participants 602A, 602B, and 602C tiles may be rearranged (such as reduced in size and moved to an edge of the user interface 600). In an example, when a companion tile is expanded, any other companion tiles may become hidden. When a companion tile is collapsed, the arrangement of tiles in the user interface 600 is returned to the pre-expansion arrangement.

In an example, a companion tile may include a hide/show control, such as a control 608. If a companion tile is currently shown, the control 608, when invoked with respect to a companion tile, causes the companion tile to become hidden (such as by animatedly sliding behind the corresponding participant tile). A state of the control 608 may be changed to indicate that the companion tile can be unhidden by invoking the control 608. For example, as illustrated in a conference tile view 610, a control 608' illustrates that the companion tile can be unhidden by invoking the control 608'.

In an example, a conference participant may enable other conference participants to control their companion tile. Controlling a companion tile includes controlling (e.g., modifying) the content displayed in the companion tile. For example, by invoking a toggle 614, a conference participant enables other conference participants to control their companion tile. The user interface 600 illustrates that the participant 602A has enabled (indicated by the state of toggle 614 being turned on) other conference participants to control the companion tile 604A. Thus, if the user interface 600 is displayed on a device of the participant 602B, then controls 612 are enabled for the participant 602B with respect to the companion tile 604A. The controls 612 can be used to show a previous image, to pause an auto-play mode, to resume an auto-play mode, and to show a next image in the image list being shared by the participant 602A. When a control, such as a next image or a previous image command, is invoked, a request for the image is transmitted to a secondary device management software 410 of FIG. 4, which in turn transmits a request for the image to the secondary device, as further described with respect to FIG. 8.

A control 616 enables a conference participant to stop sharing content from their secondary device to the conference. In response to the control 616 being invoked, a request is transmitted to the secondary device management software to stop transmitting content received from the secondary device to devices of the conference participants. In an example, the secondary device management software transmits a command to the content sharing software to stop transmitting content to the secondary device management software. A control 618 enables a conference participant to indicate that other conference participants are allowed to download (e.g., save to their respective devices) images being displayed in their companion tile.

In an example, to connect a secondary device to the conference, a conference participant may first obtain a key that the conference participant includes in the request to connect a secondary device to the conference. As such, a control 620 (e.g., "GET KEY" control) enables a conference participant to obtain the key by causing a get-key request to be transmitted to the secondary device management software 410. In response to the get-key request, the secondary device management software transmits the key (e.g., a string of characters) for display in the user interface 600. The conference participant can include the key in the request to connect the secondary device.

In another example, the secondary device management software 410 may transmit the key or a connection string (i.e., a unique string that may include a key or other data uniquely identifying the conference participant) directly to the secondary device. For example, the conference participant may provide a telephone number of the secondary device or an email address accessible from the secondary device. The connection string, when invoked (e.g., clicked) at the secondary device, causes the content sharing software therein to transmit a request to connect the secondary device to the conference. The request to connect can include the unique data usable by the secondary device management software to identify the conference participant.

The user interface 600 may include a chat window 622. The chat window can be used by conference participants to send messages or other content with other participants. In an example, instead of sharing content (such as images) in a companion tile, a conference participant may configure content sharing to the chat window. In an example, a user interface, such as one of the user interfaces described with respect to FIG. 5, may include an option that enables the conference participant to select whether to share content to a companion tile or to a shared tile (such as a chat window).

FIG. 7 is an example of a technique 700 for connecting a user device to a conference as a secondary device. The technique 700 can be executed using computing devices, such as the systems, hardware, and software described with respect to FIGS. 1-6. The technique 700 can be performed, for example, by executing a machine-readable program or other computer-executable instructions, such as routines, instructions, programs, or other code. The steps, or operations, of the technique 700 or another technique, method, process, or algorithm described in connection with the implementations disclosed herein can be implemented directly in hardware, firmware, software executed by hardware, circuitry, or a combination thereof. The technique 700 can be performed by a software platform, such as the software platform 404 of FIG. 4, and more specifically by a secondary device management software therein, such as the secondary device management software 410 of FIG. 4.

At 702, a request is received from a device to connect to a conference as a secondary device. The request may be received, for example, from the secondary device 416 of FIG. 4. More specifically, the request may be transmitted by the content sharing software 420, such as in response to the user of the device causing the request to be transmitted.

At 704, the secondary device management software identifies a conference participant associated with the request. In an example, the request may include an identity (e.g., an identifier, such as a username) of the conference participant. For example, prior to submitting the request, the conference participant may be required to authenticate themselves via the content sharing software. In an example, the request can include data that can be used to identify the conference participant. For example, an invitation to join a conference may include a participant-specific key (e.g., a string of characters) that the conference participant uses to join the conference. Other ways of identifying the conference participant are possible, such as described with respect to FIG. 6.

At 706, the secondary device management software determines whether the conference participant is already joined to the conference via another device. That is, the secondary device management software determines whether a primary device of the conference participant is already connected to the conference. If the conference participant is not already joined to the conference via a primary device, then the request to connect the secondary device is rejected at 708. On the other hand, if the conference participant is already joined to the conference via a primary device, then, at 710, the secondary device management software connects the device to the conference as a secondary device.

Figure 8:
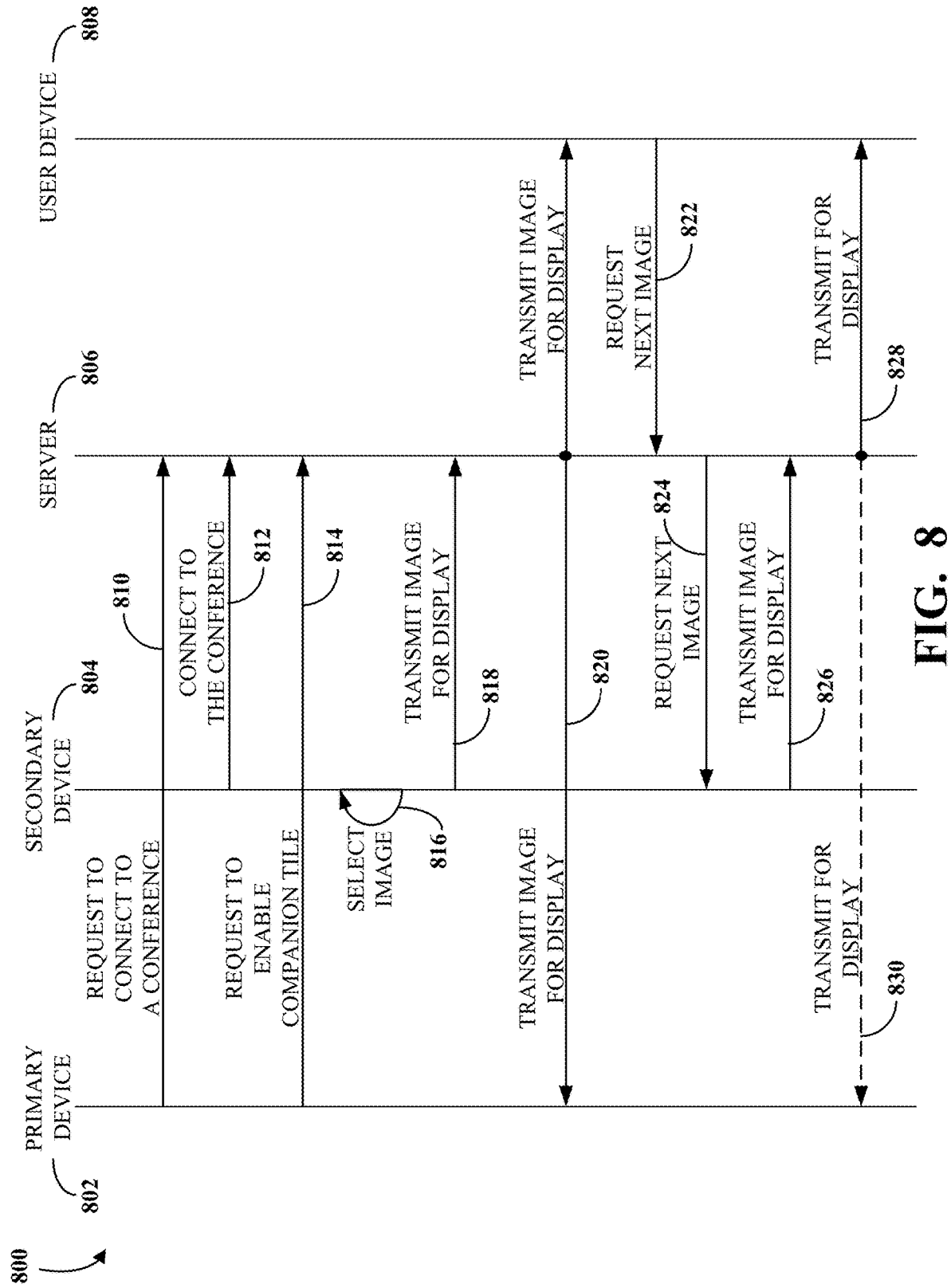
FIG. 8 is an example of an interaction diagram for sharing images to a conference from a secondary device.

FIG. 8 is an example of an interaction diagram 800 for sharing images to a conference from a secondary device.

The interaction diagram 800 can be executed using computing devices, such as the systems, hardware, and software described with respect to FIGS. 1-6. The interaction diagram 800 illustrates that a conference participant is joined to a conference using a primary device 802 and a secondary device 804. The conference is hosted by a server 806, which includes a conferencing software platform, such as the software platform 404 of FIG. 4. At least one other conference participant is also joined to the conference via a user device 808. The conference participant shares images available at the secondary device 804 to the conference. Sharing images to the conference can mean that images available at the secondary device 804 are transmitted to the server (e.g., to the conferencing software therein) which in turn transmits the images for display at devices of the conference participants, such as at the primary device 802 and the user device 808.

At 810, a request to connect the primary device 802 to the conference is transmitted from the primary device 802 to the server. Said another way, a user of the primary device 802 causes the request to be transmitted so that the user can be joined to the conference. In response to the request, the server 806 connects the primary device 802 to the conference. At 812, a request to connect the secondary device 804 to the conference is transmitted from the secondary device 804 to the server. In response to the request, the secondary device is connected to the conference.

At 814, the conference participant enables a companion tile. As such, a request can be transmitted from the primary device to the server 806 indicating that a companion tile is to be shown, in association with the conference participant, in user interfaces associated with the conferencing software, such as the user interface 600 of FIG. 6. At 816, the conference participant selects, at the secondary device 804, an image for sharing via the content sharing software 420. The image may be an image of an image queue (e.g., a list of images) that the conference participant intends to share in the conference. At 818, the image is transmitted to the server 806. At 820, the server 806 in turn transmits the image for display at respective devices of at least some of the conference participants, such as at the primary device 810 and the user device 808.

At 822, a request is received at the server 806 from the user device 808 for a next image of the image queue. For example, the conference participant associated with the user device 808 may use a control of the controls 612 to request the next image. At 824, the server 806 (i.e., the secondary device management software therein) transmits the request to the secondary device 804 (i.e., to the content sharing software therein). At 826, the secondary device 804 transmits the requested image to the server 806.

At 828, the requested image is transmitted for display at the user device 820. As such, it is possible that the primary devices of different conference participants can request and display different images. To illustrate, at a first user device, an image may be obtained from the secondary device 804 and displayed within the companion tile and a different image may be simultaneously displayed in the companion tile at a second user device. In another example, and as shown at 830, the server 806 can also transmit the image requested via the user device 808 to primary devices of the other conference participants, such as the primary device 802. As such, regardless of the user device from which a request for an image is received, the contents of the companion tile are synchronized to show the same image.

Other variations of the interaction diagram 800, consistent with the disclosure herein, are possible. In a variant, the request to enable the companion tile, at 814, may be received from the secondary device 804. In a variant, the request to connect the secondary device 804 to the conference can be initiated from the primary device 802. To illustrate, the conference participant may invoke a command at the primary device 802 to connect a secondary device. The secondary device can be identified in any number of ways, such as by explicit selection of the secondary device, via proximity detection, or in some other way.

In the case of explicit selection, in response to the command, a user interface associated with the conferencing software and available at the primary device 802 may display devices (other than the primary device 802) associated with the conference participant. Devices associated with the conference participant can be those devices via which the conference participant is logged in, at the time that the command is invoked, to the conferencing software using the same credentials as those that the conference participant used at the primary device 802. In response to receiving a selection of a secondary device from conference participant, a request to connect the secondary device 804 to the conference may be initiated. In an example, the request may be transmitted from the primary device 802 to the secondary device 804, which in turn transmits the request to connect at 812. In another example, the request may be transmitted from the primary device 802 to the server 806, which in turn connects the secondary device 804 to the conference. In an example, if the devices associated with the conference participant include only one device, then the user interface may not be displayed and the only one device can be automatically selected.

In the proximity detection case, in response to the command, the primary device 802 can identify a proximal device associated with the conference participant. In an example, the primary device 802 may broadcast data, such as by transmitting beacon packets, that are specifically formatted to result in a response from a device associated with the conference participant. The beacon packets can be based on the Bluetooth Low Energy (BLE) beacon standard. However other communications protocols usable for communications between co-located devices can also be used, such as Infrared, Near-Field Communication (NFC), Li-Fi, low-power frequency modulation (FM), amplitude modulation (AM), or Single Side Band (SSB) radio signals, or the like. A device that receives the beacon packets can transmit a response. Based on the contents of the response, a responding device can be identified as a secondary device. In an example, the beacon packets may include data identifying the conference, which the secondary device can use to transmit the request to connect to the conference at 812.

Figure 9:
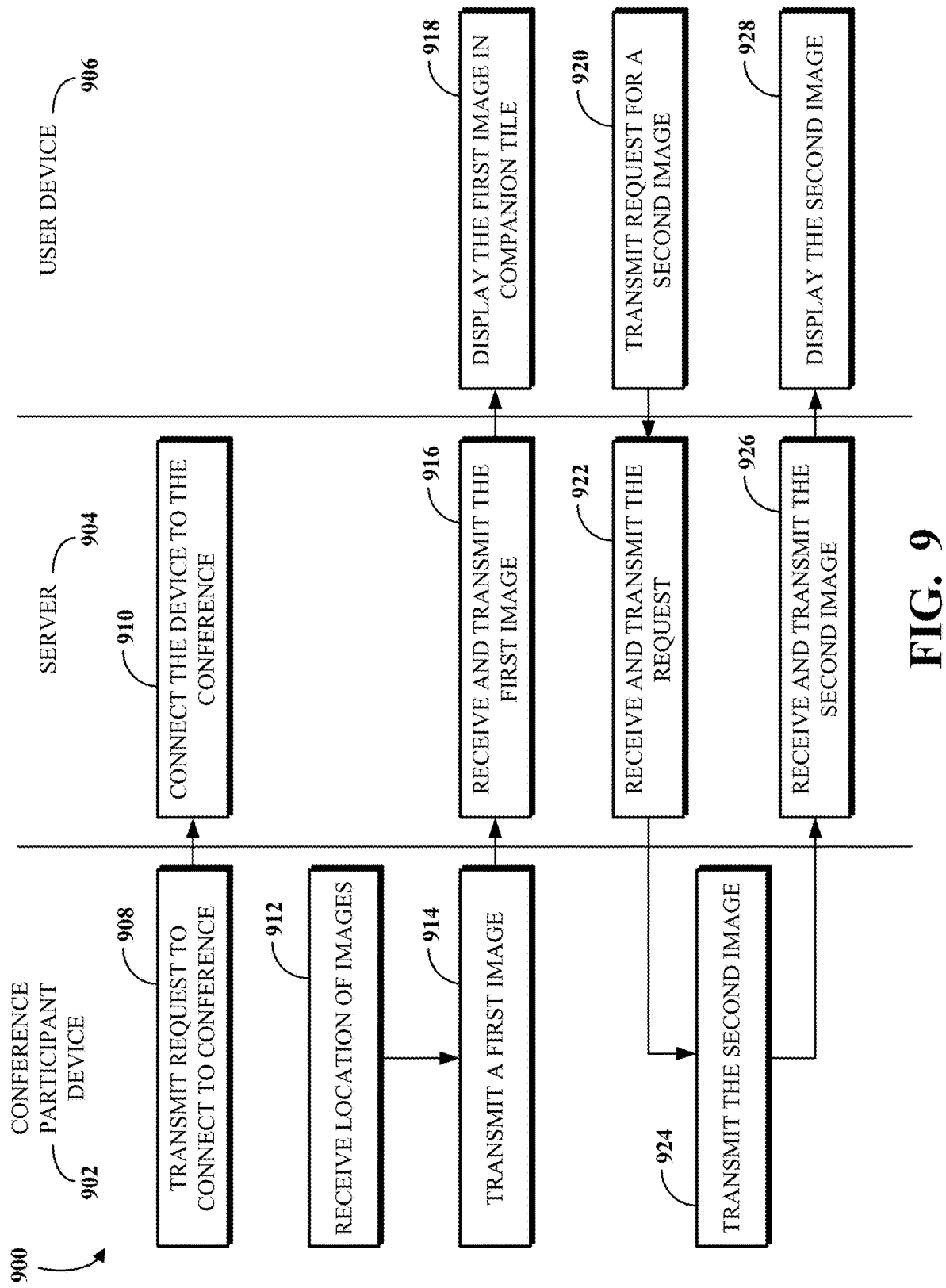
FIG. 9 is an example of an interaction diagram for sharing images to a conference.

FIG. 9 is an example of an interaction diagram 900 for sharing images to a conference. The interaction diagram 900 can be executed using computing devices, such as the systems, hardware, and software described with respect to FIGS. 1-6. The interaction diagram 900 illustrates that a conference participant is joined to a conference using a conference participant device 902. The conference is hosted by a server 904, which includes a conferencing software platform, such as the software platform 404 of FIG. 4. At least one other conference participant is also joined to the conference via a user device 906.

The conference participant shares images available at the conference participant device 902 to the conference. Sharing images to the conference can mean that images available at the conference participant device 902 are transmitted to the server 904 (e.g., to the conferencing software therein) which in turn transmits the images for display at devices of at least some of the conference participants, such as at the user device 906. A difference between the interaction diagram 800 and the interaction diagram 900 is that the images (such as shown in the image list 524 of FIG. 4) to be shared are available at the primary device itself.

At 908, a request to connect the conference participant device 902 to a conference is transmitted from the conference participant device 902 to the server 904. At 910, the server 904 connects the device to the conference. That is, the conferencing software of the server 904 joins the user of the conference participant device 902 to the conference.

At 912, a location of a set of images is received. The location of the set of images can be such that the interaction diagram 900 can be used, inter alia, to obtain a listing of the individual images of the set of images, an ordering of the images, and/or a next or previous image based on the ordering. In an example, the location of the set of images can be received before the conference participant device 902 is connected to the conference.

The location of the set of images can be received in any number of ways. Receiving the location of the set of images can be similar to that described with respect to the user interface 520 of FIG. 5. Via a user interface (not shown), a conferencing software, such as the conferencing software 418 of FIG. 4, or a content sharing software associated therewith or included therein, may enable the conference participant to navigate to, select, and provide a pointer to the location of the set of images. The location of the set of images may be a folder location available at or accessible via the conference participant device 902. The location of the set of images may be a network-based (e.g., cloud-based) location (e.g., repository). The location can be a hyperlink that provides access to the set of images. Other locations of sets of images are possible.

At 914, a first image of the images is transmitted from the conference participant device 902 to the server 904. In an example, the conference participant can select the first image for transmission to the server 904. In an example, a listing of the images may be displayed to the conference participant in user interface similar to that of the user interface 502 of FIG. 5 and the conference participant can select one of the images for sharing (e.g., transmission). In an example, the conference participant can use a control, such as one of the controls 612 of FIG. 6 to select the first image.

At 916, the first image is received at the server 904, which in turn transmits the first image to devices of other conference participants, such as the user device 906. At 918, the first image is displayed at the user device 906 in a companion tile associated with the conference participant device 902. The first image can be displayed in the companion tile as described with respect to FIG. 6.

At 920, a request for a second image of the images is transmitted from the user device 906. In an example, and as described with respect to FIG. 6, the conference participant of the user device 906 may use a control of the companion tile associated with the conference participant device 902 to transmit the request for the second image. At 922, the request is received at the server 904, which in turn transmits the request for the second image to the conference participant device 902. At 924, the second image is transmitted from the conference participant device 902 to the server 904 in response to the request. At 926, the server 904 receives the second image and in turn transmits it to the user device 906. At 928, the second image is displayed at the user device 906 in the companion tile.

Figure 10:
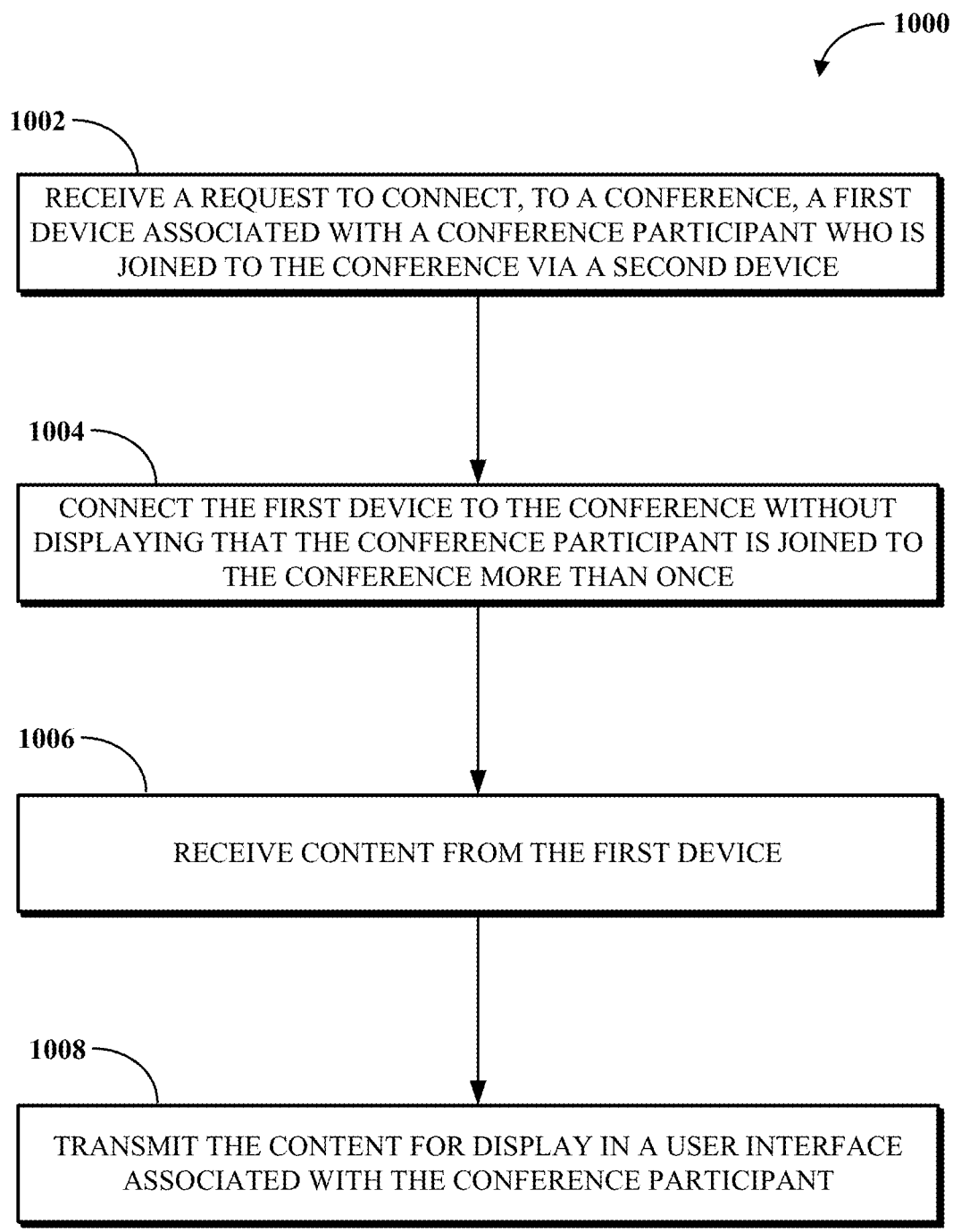
FIG. 10 is a flowchart of an example of a technique for connecting two devices of a conference participant to a conference.

To further describe some implementations in greater detail, reference is next made to examples of techniques which may be performed for joining a conference using a secondary device and sharing content to the conference from the secondary device. FIG. 10 is a flowchart of an example of a technique 1000 for connecting two devices of a conference participant to a conference. The technique 1000 can be executed using computing devices, such as the systems, hardware, and software described with respect to FIGS. 1-9. The technique 1000 can be performed, for example, by executing a machine-readable program or other computer-executable instructions, such as routines, instructions, programs, or other code. The steps, or operations, of the technique 1000 or another technique, method, process, or algorithm described in connection with the implementations disclosed herein can be implemented directly in hardware, firmware, software executed by hardware, circuitry, or a combination thereof. The technique 1000 can be performed, at least in part, by a secondary device management software, such as the secondary device management software 410 of FIG. 4.

At 1002, a request is received to connect a first device to a conference. The first device is associated with a conference participant who is joined to the conference via a second device. The first device can be the secondary device 416 and the second device can be the primary device 412 of FIG. 4. The request can be received at the software platform 404 of FIG. 4. As described above, the request can be received from the first device or from the second device. At 1004, the first device is connected to the conference. The first device is connected to the conference in such a way, and as described above, such as with respect to FIG. 6, that the conference participant is not displayed (e.g., listed) as being joined to the conference more than once in a user interface that lists conference participants.

At 1006, content is received from the first device based on a command. In an example, the command can be one of the options 504, 506, or 508 of FIG. 5. In an example, the command can be received from the first device. In an example, the command can be received from the second device. For example, the conference participant can use their primary device (i.e., the second device) to transmit a request to the secondary device management software 410 of FIG. 4 to obtain a next image from the first device (i.e., the secondary device). In an example, the command can be received from a third device associated with another conference participant. For example, the command can be received from the user device 414 of FIG. 4. For example, the command can be received in response to one of the controls 612 being invoked at the third device. For example, the command can be received as described with respect to 822 of FIG. 8. In an example, the content can be an image stored at the first device. In an example, the content can be media data streamed from a camera of the first device. In an example, the content can be data displayed at the first device. At 1008, the content is transmitted for display in the user interface associated with the conference participant.

Figure 11:
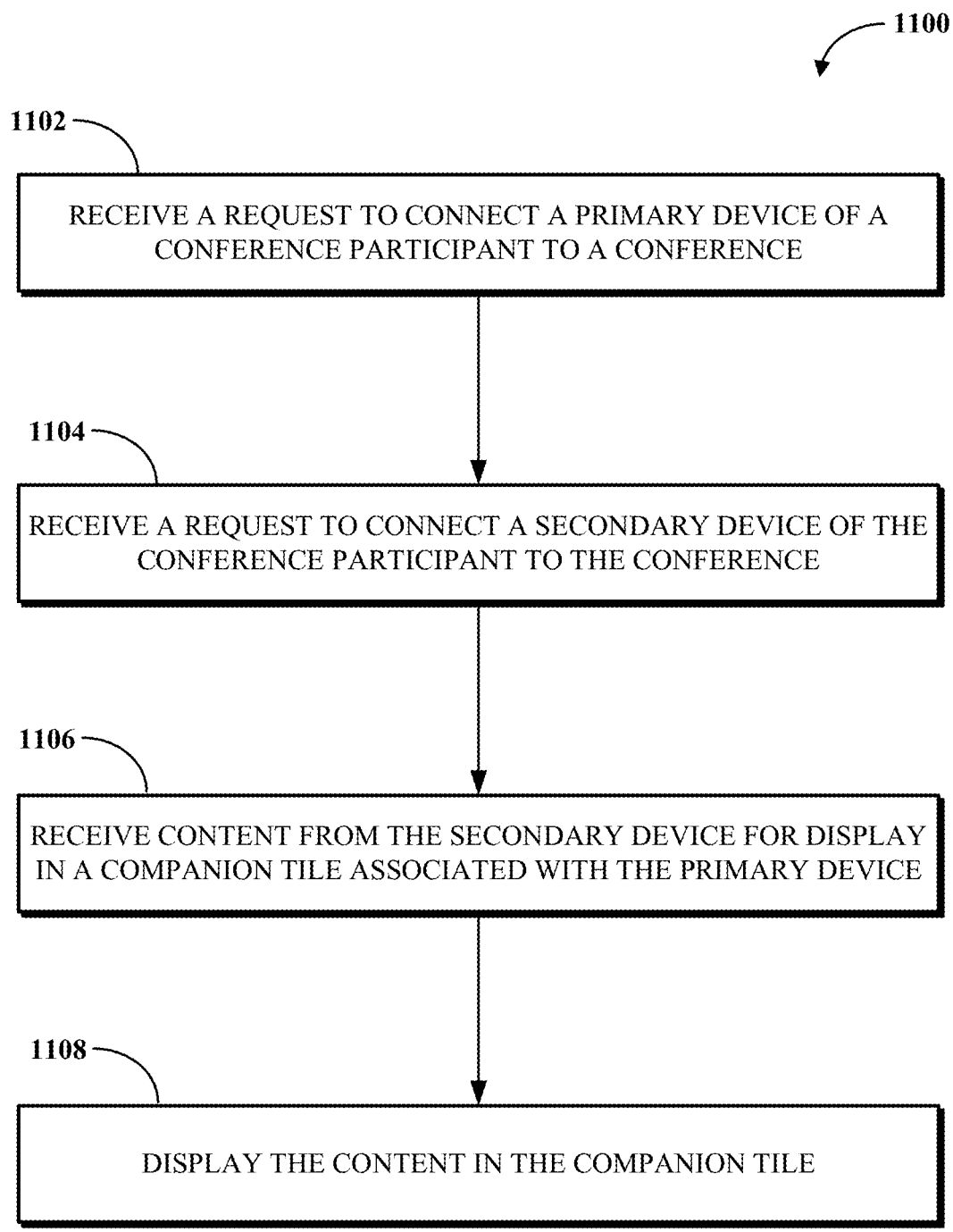
FIG. 11 is a flowchart of an example of a technique for displaying content received from a secondary device in a companion tile.

FIG. 11 is a flowchart of an example of a technique 1100 for displaying content received from a secondary device in a companion tile. The technique 1100 can be executed using computing devices, such as the systems, hardware, and software described with respect to FIGS. 1-9. The technique 1100 can be performed, for example, by executing a machine-readable program or other computer-executable instructions, such as routines, instructions, programs, or other code. The steps, or operations, of the technique 1100 or another technique, method, process, or algorithm described in connection with the implementations disclosed herein can be implemented directly in hardware, firmware, software executed by hardware, circuitry, or a combination thereof.

At 1102, a request is received to connect a primary device of a conference participant to a conference. The request can be received from the primary device. At 1104, a request is received to connect a secondary device of the conference participant to the conference. The request can be received from the secondary device. In an example, the request can be received from the primary device. In another example, the request can be received from the secondary device.

At 1106, content is received from the secondary device for display in a companion tile associated with the primary device. As described with respect to FIG. 6, each conference participant is represented by or associated with a respective tile in a user interface associated with the conference. The tile is said to be associated with the primary device of the conference participant. That is, the tile is associated with the first device of the conference participant connected to the conference. Said another way, the tile is associated with the first device that the conference participant used to join the conference. When a conference participant is sharing content from the secondary device, a companion tile is associated with the primary device. Said another way, the companion tile does not indicate that the conference participant is joined twice to the conference. As described above, the content can be received by a secondary device management software, such as the secondary device management software 410 of FIG. 4.

At 1108, the content is displayed in the companion tile. That the content is displayed in the companion tile can include that the content is transmitted to a user device of a conference participant where a conferencing software therein can cause the content to be displayed in the companion tile in a user interface associated with the conferencing software.

In an example, a request for the content can be received from a user device connected to the conference and that is different from the primary device and the secondary device. The user device can be the user device 414 of FIG. 4. In an example, a command can be received from the primary device to enable another conference participant other than the conference participant to control the companion tile, such as described with respect to the toggle 614 of FIG. 6. In an example, the content can be a video stream obtained using a camera of the secondary device. In an example, the content can be screen content of the secondary device. In an example, the companion tile can be a chat window associated with the conference.

In an example, where the content includes a first image and a second image, a request for the first image can be received from a first device of first conference participant and a request for the second image can be received from a second device of a second conference participant. Concurrently, the first image can displayed in the companion tile at the first device and the second image can be displayed in the companion tile at the second device.

Figure 12:
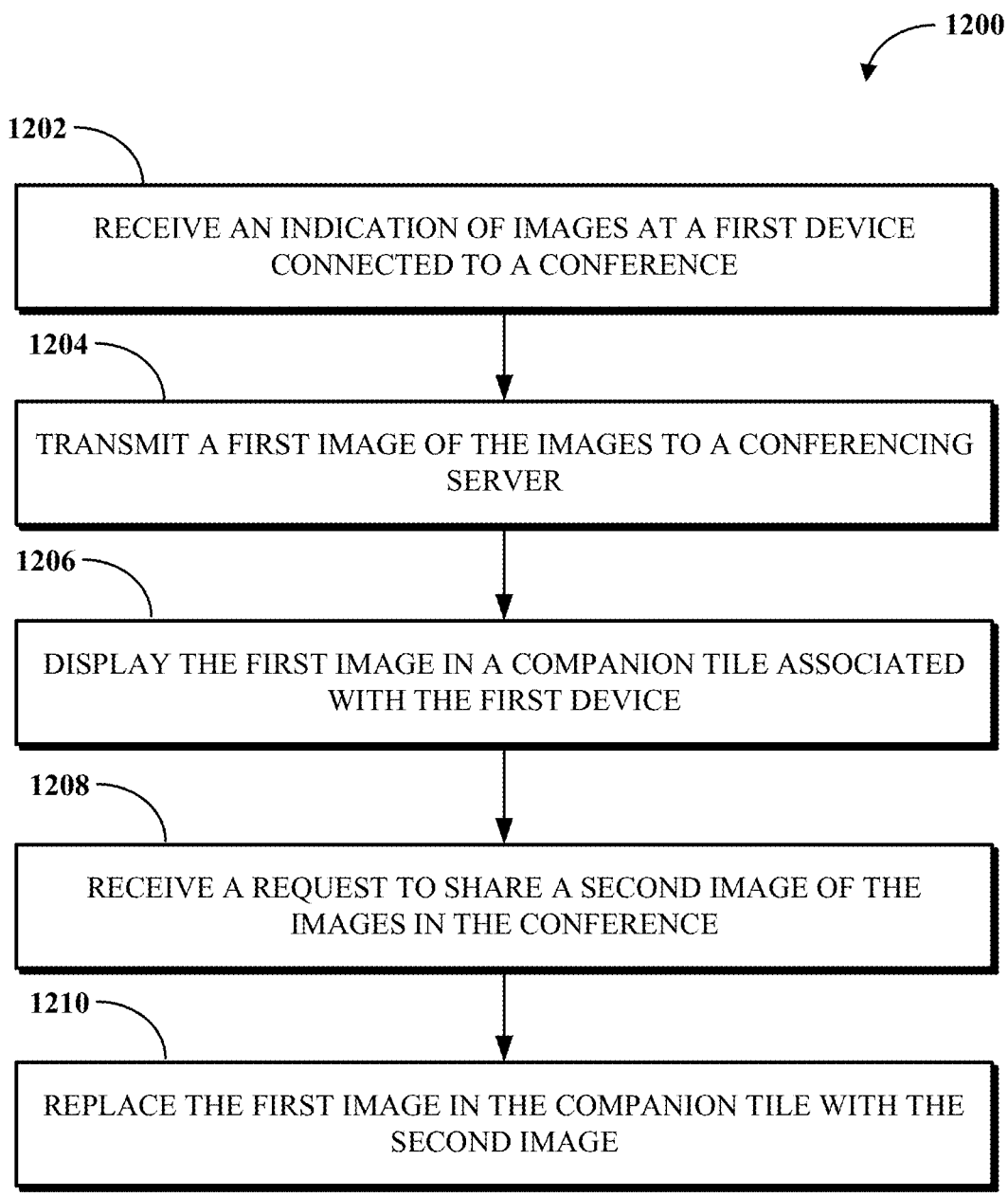
FIG. 12 is a flowchart of an example of a technique for displaying images in a companion tile.

FIG. 12 is a flowchart of an example of a technique 1200 for displaying images in a companion tile. The images can be available to or accessible via a device (e.g., a first device) of a conference participant who selects to share the images to a conference. The technique 1200 can be executed using computing devices, such as the systems, hardware, and software described with respect to FIGS. 1-9. The technique 1200 can be performed, for example, by executing a machine-readable program or other computer-executable instructions, such as routines, instructions, programs, or other code. The steps, or operations, of the technique 1200 or another technique, method, process, or algorithm described in connection with the implementations disclosed herein can be implemented directly in hardware, firmware, software executed by hardware, circuitry, or a combination thereof.

At 1202, an indication of images is received at the first device connected to the conference. The indication of the images can be a location of the images, as described above with respect to FIG. 9. At 1204, a first image of the images is transferred to a conferencing server based on a request to share the first image in the conference. For example, the conference participant can use one of the controls 612 or a control similar to one of the controls described with respect to FIG. 5 to select the first image or to cause the first image to be shared to the conference. At 1206, the first image is displayed in a companion tile associated with the first device. The first image can be transmitted to the conferencing server, which in turn may transmit the first image to one or more other devices connected to the conference. As described with respect to FIG. 6, the first image can be displayed at the one or more other devices in companion tiles associated with the first device.

At 1208, a request to share a second image of the images in the conference is received. In an example, the request to share the second image can be received from the first device. In another example, the request to share the second image can be received from another device, as described above. At 1210, the first image is replaced in the companion tile with the second image. As described with respect to the toggle 614 of FIG. 6, a conference participant can enable other conference participants to control their companion tile. Thus, the request to share the second image can be received from another device if so enabled by the conference participant.

While not specifically described above, thumbnails of the images can be generated at the device via which the image are shared. As such, in an example, thumbnails can be generated at the first device of the conference participant. For example, the thumbnails can be generated in response to receiving the indication of the images. In another example, the thumbnails can be generated on demand (e.g., in response to a request for the thumbnails). The thumbnails are small representations of the images and can be used to provide previews of the images. A thumbnail typically has a reduced size as compared to the corresponding original image and, as such, can use less network bandwidth to transfer and less screen real estate to display. In an example, thumbnails of at least some of the images can be transmitted to the conferencing server. The thumbnails can be displayed in the companion tile at the first device and/or one other device connected to the conference. A conference participant can select a thumbnail to an image to cause the second image to be shared or transmitted for display.

In an example, a request can be received from a second device to download a third image to the second device. As described above with respect to the control 618 of FIG. 6, other conference participants can be allowed to download (e.g., save to their respective devices) images being displayed in their companion tile. As such, in an example, a configuration to enable other conference participants to download at least some of the images can be received, such as from the conference participant.

In an example, other conference participants may be allowed (e.g., enabled or configured) to download images only for the duration of the conference. That is, other conference participants may not be permitted to retain downloaded images after the conference terminates or after they leave the conference. As such, in association with an image of the images transferred to a second device in response to a download command, a configuration that causes the image to be deleted from the second device when the second device disconnects from the conference may be transmitted to the second device. Said another way, when an image is transferred to another device, a configuration may be transferred with the image indicating to the other device (i.e., the conferencing software therein) to delete the image when the other device disconnects from the conference.

In another example, an explicit command to delete a downloaded image may be transmitted to the other device. The command to delete may be transmitted in response to the conference participant invoking a control in a user interface that causes the command to delete to be transmitted. In an example, the conference participant can select an image that was downloaded and causes commands to delete to be transmitted to devices to which the image was downloaded. In an example, the conference participant can select one or more conference participants and cause commands to delete to be transmitted to the devices of the one or more conference participants. In response to receiving the command to delete at a device, the conferencing software therein deletes all images that were downloaded to the device during the conference.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method. The method includes receiving a request to connect a primary device of a conference participant to a conference; receiving a request to connect a secondary device of the conference participant to the conference, receiving content from the secondary device for display in a companion tile associated with the primary device, and displaying the content in the companion tile. Other embodiments of this aspect include corresponding computer systems, apparatus, and computer programs recorded on one or more computer storage devices, each configured to perform the actions of the methods.

Implementations may include one or more of the following features. The method may include receiving a request for the content from a user device that is connected to the conference and that is different from the primary device and the secondary device. The content may include a first image and a second image and receiving the content from the secondary device for display in the companion tile associated with the primary device may include receiving a request for the first image from a first device of a first conference participant; and receiving a request for the second image from a second device of a second conference participant; and where displaying the content in the companion tile may include concurrently displaying the first image in the companion tile at the first device and the second image in the companion tile at the second device. The content may include a video stream obtained using a camera of the secondary device. The content may include screen content of the secondary device. The method may include receiving, from the primary device, a command to enable another conference participant other than the conference participant to control content displayed in the companion tile. The companion tile can be a chat window associated with the conference. Implementations of the described techniques may include hardware, a method or process, or computer software on a computer-accessible medium.

One general aspect includes a device. The device also includes a memory and a processor. The processor can be configured to execute instructions stored in the memory to receive a request to connect a primary device of a conference participant to a conference; receive a request to connect a secondary device of the conference participant to the conference; receive content from the secondary device for display in a companion tile associated with the primary device; and display the content in the companion tile. Other embodiments of this aspect include corresponding computer systems, apparatus, and computer programs recorded on one or more computer storage devices, each configured to perform the actions of the methods.

Implementations may include one or more of the following features. The device where the processor can be further configured to execute instructions stored in the memory to receive a request for the content from a user device that is connected to the conference and that is different from the primary device and the secondary device. The content may include a first image and a second image; where the instructions to receive the content from the secondary device for display in the companion tile associated with the primary device may include instructions to receive a request for the first image from a first device of a first conference participant; and receive a request for the second image from a second device of a second conference participant; and where the instructions to display the content in the companion tile may include instructions to: concurrently display the first image in the companion tile at the first device and the second image in the companion tile at the second device. The content may include a video stream obtained using a camera of the secondary device. The content may include screen content of the secondary device. The processor can be further configured to execute instructions stored in the memory to receive, from the primary device, a command to enable another conference participant other than the conference participant to control the companion tile. The companion tile can be a chat window associated with the conference. Implementations of the described techniques may include hardware, a method or process, or computer software on a computer-accessible medium.

One general aspect includes a non-transitory computer readable medium storing instructions operable to cause one or more processors to perform operations. The operations include receiving a request to connect a primary device of a conference participant to a conference; receiving a request to connect a secondary device of the conference participant to the conference, receiving content from the secondary device for display in a companion tile associated with the primary device, and displaying the content in the companion tile. Other embodiments of this aspect include corresponding computer systems, apparatus, and computer programs recorded on one or more computer storage devices, each configured to perform the actions of the methods.

Implementations may include one or more of the following features. The non-transitory computer readable medium where the operations may further include receiving a request for the content from a user device that is connected to the conference and that is different from the primary device and the secondary device. The content may include a first image and a second image; where receiving the content from the secondary device for display in the companion tile associated with the primary device may include: receiving a request for the first image from a first device of a first conference participant; and receiving a request for the second image from a second device of a second conference participant; and where displaying the content in the companion tile may include: concurrently displaying the first image in the companion tile at the first device and the second image in the companion tile at the second device. The content may include a video stream obtained using a camera of the secondary device. The content may include screen content of the secondary device. The operations may further include receiving, from the primary device, a command to enable another conference participant other than the conference participant to control the companion tile. Implementations of the described techniques may include hardware, a method or process, or computer software on a computer-accessible medium.

For simplicity of explanation, the techniques 700, 1000, 1100, and 1200 of FIGS. 7, 10, 11, and 12, respectively are depicted and described herein as respective series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   receiving a request to connect a primary device of a conference participant to a conference;
   displaying a representation of the conference participant in a tile associated with the primary device, the tile being displayed in a user interface associated with the conference;
   receiving a request to connect a secondary device of the conference participant to the conference;
   connecting the secondary device to the conference without adding to the user interface a new tile representing the conference participant;
   receiving content from the secondary device for display in a companion tile associated with the tile, the companion tile being displayed in the user interface; and
   displaying the content in the companion tile.

2. The method of claim 1, further comprising:
   receiving a request for the content from a user device that is connected to the conference and that is different from the primary device and the secondary device.

3. The method of claim 1,
   wherein the content comprises a first image and a second image;
   wherein receiving the content from the secondary device for display in the companion tile associated with the tile comprises:
      receiving a request for the first image from a first device of a first conference participant; and
      receiving a request for the second image from a second device of a second conference participant; and
   wherein displaying the content in the companion tile comprises:
      concurrently displaying the first image in the companion tile at the first device and the second image in the companion tile at the second device.

4. The method of claim 1, wherein the content comprises a video stream obtained using a camera of the secondary device.

5. The method of claim 1, wherein the content comprises screen content of the secondary device.

6. The method of claim 1, further comprising:
receiving, from the primary device, a command to enable another conference participant other than the conference participant to control content displayed in the companion tile.

7. The method of claim 1, wherein the companion tile is a chat window associated with the conference.

8. A device, comprising:
a memory; and
a processor, the processor configured to execute instructions stored in the memory to:
receive a request to connect a primary device of a conference participant to a conference;
display a representation of the conference participant in a tile associated with the primary device, the tile being displayed in a user interface associated with the conference;
receive a request to connect a secondary device of the conference participant to the conference;
connect the secondary device to the conference without adding to the user interface a new tile representing the conference participant;
receive content from the secondary device for display in a companion tile associated with the tile, the companion tile being displayed in the user interface; and
display the content in the companion tile.

9. The device of claim 8, wherein the processor is further configured to execute instructions stored in the memory to:
receive a request for the content from a user device that is connected to the conference and that is different from the primary device and the secondary device.

10. The device of claim 8,
wherein the content comprises a first image and a second image;
wherein the instructions to receive the content from the secondary device for display in the companion tile associated with the tile comprise instructions to:
receive a request for the first image from a first device of a first conference participant; and
receive a request for the second image from a second device of a second conference participant; and
wherein the instructions to display the content in the companion tile comprise instructions to:
concurrently display the first image in the companion tile at the first device and the second image in the companion tile at the second device.

11. The device of claim 8, wherein the content comprises a video stream obtained using a camera of the secondary device.

12. The device of claim 8, wherein the content comprises screen content of the secondary device.

13. The device of claim 8, wherein the processor is further configured to execute instructions stored in the memory to:
receive, from the primary device, a command to enable another conference participant other than the conference participant to control the companion tile.

14. The device of claim 8, wherein the companion tile is a chat window associated with the conference.

15. A non-transitory computer readable medium storing instructions operable to cause one or more processors to perform operations comprising:
receiving a request to connect a primary device of a conference participant to a conference;
displaying a representation of the conference participant in a tile associated with the primary device, the tile being displayed in a user interface associated with the conference;
receiving a request to connect a secondary device of the conference participant to the conference;
connecting the secondary device to the conference without adding to the user interface a new tile representing the conference participant;
receiving content from the secondary device for display in a companion tile associated with the tile, the companion tile being displayed in the user interface; and
displaying the content in the companion tile.

16. The non-transitory computer readable medium of claim 15, wherein the operations further comprise:
receiving a request for the content from a user device that is connected to the conference and that is different from the primary device and the secondary device.

17. The non-transitory computer readable medium of claim 15,
wherein the content comprises a first image and a second image;
wherein receiving the content from the secondary device for display in the companion tile associated with the tile comprises:
receiving a request for the first image from a first device of a first conference participant; and
receiving a request for the second image from a second device of a second conference participant; and
wherein displaying the content in the companion tile comprises:
concurrently displaying the first image in the companion tile at the first device and the second image in the companion tile at the second device.

18. The non-transitory computer readable medium of claim 15, wherein the content comprises a video stream obtained using a camera of the secondary device.

19. The non-transitory computer readable medium of claim 15, wherein the content comprises screen content of the secondary device.

20. The non-transitory computer readable medium of claim 15, wherein the operations further comprise:
receiving, from the primary device, a command to enable another conference participant other than the conference participant to control the companion tile.

* * * * *